United States Patent
Sato

(10) Patent No.: US 10,027,844 B2
(45) Date of Patent: Jul. 17, 2018

(54) CONTROL METHOD FOR AN IMAGE FORMING APPARATUS WHICH PERFORMS TRANSMISSION OF INFORMATION

(71) Applicant: CANON KABUSHIKI KAISHA, Tokyo (JP)

(72) Inventor: Haruki Sato, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/381,814

(22) Filed: Dec. 16, 2016

(65) Prior Publication Data

US 2017/0180597 A1 Jun. 22, 2017

(30) Foreign Application Priority Data

Dec. 22, 2015 (JP) ................................. 2015-250237

(51) Int. Cl.
*G06F 3/12* (2006.01)
*H04N 1/32* (2006.01)
*H04N 1/00* (2006.01)

(52) U.S. Cl.
CPC ..... *H04N 1/32619* (2013.01); *H04N 1/00925* (2013.01); *H04N 1/32074* (2013.01); *H04N 1/32085* (2013.01); *H04N 1/32694* (2013.01); *H04N 2201/0039* (2013.01); *H04N 2201/0082* (2013.01); *H04N 2201/3295* (2013.01)

(58) Field of Classification Search
None
See application file for complete search history.

(56) References Cited

U.S. PATENT DOCUMENTS

| 7,855,795 B2* | 12/2010 | Ueda ................. H04N 1/32074 358/1.14 |
| 8,253,963 B2* | 8/2012 | Odagiri ................. G06K 15/00 358/1.14 |
| 8,275,861 B2* | 9/2012 | Kawai ..................... H04L 41/12 358/1.15 |
| 8,621,288 B2* | 12/2013 | Igarashi ............. G03G 15/5079 714/57 |

(Continued)

FOREIGN PATENT DOCUMENTS

| JP | 2002-297336 A | 10/2002 |
| JP | 2012-138113 A | 7/2012 |
| JP | 2012138113 A * | 7/2012 |

*Primary Examiner* — Dung D Tran

(74) *Attorney, Agent, or Firm* — Canon U.S.A., Inc. IP Division

(57) ABSTRACT

A control method for an image forming apparatus configured to perform transmission of information includes performing retransmission of the information a predetermined number of times in a case where the transmission of the information fails, wherein an entry about the retransmission of the information is added to a notification table managed by the image forming apparatus, clearing the entry from the notification table, in a case where the retransmission of the information is completed the predetermined number of times or a case where the image forming apparatus receives a response to the retransmission of the information, and clearing the entry from the notification table in a case where user information necessary for the retransmission of the information is changed.

8 Claims, 14 Drawing Sheets

(56) References Cited

U.S. PATENT DOCUMENTS

| | | | | |
|---|---|---|---|---|
| 8,862,997 B2* | 10/2014 | Torii | .................. | H04L 41/0213 |
| | | | | 709/222 |
| 2006/0143479 A1* | 6/2006 | Morita | ................. | G06F 21/608 |
| | | | | 713/193 |
| 2006/0168263 A1* | 7/2006 | Blackmore | ......... | H04L 41/0213 |
| | | | | 709/230 |
| 2007/0206574 A1* | 9/2007 | Ueda | ................. | H04N 1/32074 |
| | | | | 370/352 |
| 2012/0084606 A1* | 4/2012 | Igarashi | ............ | G03G 15/5079 |
| | | | | 714/37 |
| 2014/0036312 A1* | 2/2014 | Haak | .................... | G06F 3/1294 |
| | | | | 358/1.15 |
| 2014/0268226 A1* | 9/2014 | Yoshida | ............. | G06F 11/0733 |
| | | | | 358/1.15 |

\* cited by examiner

FIG. 3

| ERROR NAME | ERROR CODE |
|---|---|
| OUT OF TONER | 1101 (markerTonerEmpty) |
| OUT OF PAPER | 808 (inputMediaSupplyEmpty) |
| JAM INSIDE MAIN BODY | 8 (jam) |
| MAIN BODY COVER OPEN | 3 (coverOpen) |

FIG. 6

| request-id | notification address | SNMPV3 user ID | notification error |
|---|---|---|---|
| 1 | 192.168.10.101 | 1 | inputMediaSupplyEmpty(808) |
| 3 | host11.example1.co.jp | 3 | jam(8) |
| 4 | 192.168.10.101 | 1 | jam(8) |

600

CONTROL METHOD FOR AN IMAGE FORMING APPARATUS WHICH PERFORMS TRANSMISSION OF INFORMATION

BACKGROUND OF THE INVENTION

Field of the Invention

The present invention relates to a control method for an image forming apparatus.

Description of the Related Art

One example of devices connected to networks is an image forming apparatus. The status of the image forming apparatus may be monitored by a monitoring method in which a monitoring terminal acquires status information from the image forming apparatus by performing periodical polling monitoring (Japanese Patent Application Laid-Open No. 2002-297336). Other examples of the monitoring methods include methods defined in Request for Comments (RFC), such as Simple Network Management Protocol Trap (SNMP-Trap) (RFC 3411), and InformRequest (RFC 3411). In the monitoring method using Trap/InformRequest, an image forming apparatus transmits a Trap/InformRequest to a predetermined monitoring terminal when the status of the image forming apparatus changes (Japanese Patent Application Laid-Open No. 2012-138113).

As for an InformRequest for confirming arrival of a packet, the image forming apparatus retransmits the InformRequest a predetermined number of times at predetermined intervals until the arrival of the InformRequest is confirmed. As for Trap/InformRequest notification of SNMP version 3 (v3), the Trap/InformRequest notification is performed based on a predetermined notification destination address and SNMPv3 user information to be used in the notification.

However, no consideration has been given to a case where InformRequest notification settings or SNMPv3 user information settings are changed during the retransmission of the InformRequest. Accordingly, even if the InformRequest notification settings or SNMPv3 user information settings are changed, the image forming apparatus continues the retransmission of the InformRequest, based on a value that are set before the settings have changed.

SUMMARY OF THE INVENTION

According to some embodiments of the present invention, a control method for an image forming apparatus configured to perform transmission of information includes performing retransmission of the information a predetermined number of times in a case where the transmission of the information fails, wherein an entry about the retransmission of the information is added to a notification table managed by the image forming apparatus, clearing the entry from the notification table, in a case where the retransmission of the information is completed the predetermined number of times or a case where the image forming apparatus receives a response to the retransmission of the information, and clearing the entry from the notification table in a case where user information necessary for the retransmission of the information is changed.

Further features of embodiments of the present invention will become apparent from the following description of exemplary embodiments with reference to the attached drawings.

BRIEF DESCRIPTION OF THE DRAWINGS

FIG. 3 is a diagram illustrating an example of error information.

FIG. 6 is a diagram illustrating an example of an InformRequest notification table.

DESCRIPTION OF THE EMBODIMENTS

Exemplary embodiments of the present invention will be described below with reference to the drawings.

(Configuration of Image Forming Apparatus)

Figure 1:
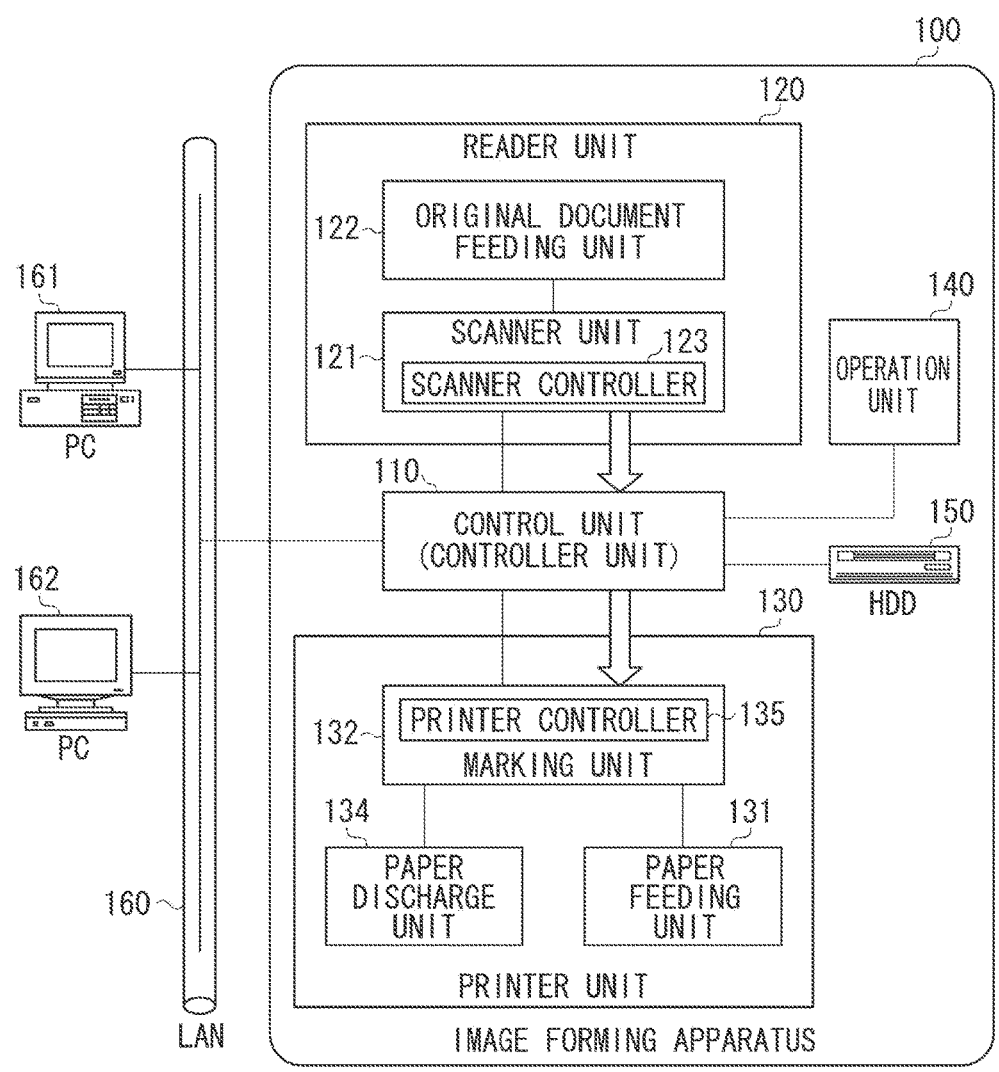
FIG. 1 is a diagram illustrating an example of a hardware configuration of an image forming apparatus.

A first exemplary embodiment will be described using an image forming apparatus that has a plurality of functions such as a copy function and a printer function as an example of an image forming apparatus. The image forming apparatus may be a single function peripheral (SFP) having only a copy function or printer function. First, a hardware configuration of an image forming apparatus 100 will be described with reference to FIG. 1. A control unit (a controller unit) 110 stores a control program and controls the entire operation of the image forming apparatus 100 by reading out the control program. The control unit 110 is electrically connected to a reader unit 120 and a printer unit 130. The control unit 110 receives data from the reader unit 120 and the printer unit 130. In addition, the control unit 110 transmits various commands to the reader unit 120 and the printer unit 130. Further, the control unit 110 is connected to monitoring terminals 161 and 162 via a network 160, and receives image data and control commands from the monitoring terminals 161 and 162 (each may be a personal computer (PC)). For example, the network 160 is implemented with a local network. The monitoring terminals 161 and 162 each monitor apparatus configuration information and status information about the current image forming apparatus 100.

The reader unit 120 optically reads an image of an original document, and converts the read image into image data. The reader unit 120 includes a scanner unit 121 and an original document feeding unit 122. The scanner unit 121 has a function of scanning an original document. The original document feeding unit 122 conveys the original document to a position where the original document can be scanned by the scanner unit 121. The scanner unit 121 includes a scanner controller 123. The scanner controller 123 controls the scanner unit 121 and the original document feeding unit 122, based on instructions from the control unit 110.

The printer unit 130 includes a paper feeding unit 131, a marking unit 132, and a paper discharge unit 134. The paper feeding unit 131 stores sheets (sheets or recording materials) for image forming (printing). The marking unit 132 transfers image data to a sheet and fixes the image data thereon. The paper discharge unit 134 discharges a printed sheet. The marking unit 132 includes a printer controller 135 that controls the marking unit 132, the paper feeding unit 131, and the paper discharge unit 134, based on instructions from the control unit 110. On the basis of instructions from the control unit 110, the printer unit 130 feeds a sheet from the paper feeding unit 131 to the marking unit 132, prints an image on the sheet based on image data with the marking unit 132, and discharges the sheet to the paper discharge unit 134. The paper discharge unit 134 can perform processes such as sorting and stapling for sheets printed in the marking unit 132. The paper feeding unit 131 includes a plurality of paper feeders each storing loaded (set) sheets. Each of the paper feeders can store one or more kinds of paper such as plain paper and glossy paper. Each of the paper feeders can also store the paper that has been printed in the printer unit 130 of the image forming apparatus 100 again. Examples of the paper feeder include a feeding cassette, a paper feeding deck, and a manual feeding tray. The type of the paper feeder is not limited to these examples, and may be other type if the paper feeder can convey paper to the marking unit 132.

An operation unit 140 includes, for example, hardware keys, a liquid crystal display section, and a touch panel section attached to a surface of the touch panel section. The operation unit 140 receives instructions from a user via these components. Further, the operation unit 140 can display software keys as well as functions and a status of the image forming apparatus 100 on the liquid crystal display section. The operation unit 140 transmits a command corresponding to an instruction from the user, to the control unit 110. A hard disk drive (HDD) 150 stores various kinds of settings of the image forming apparatus 100 and image data.

On the basis of the above-described configuration, the image forming apparatus 100 implements, for example, various functions such as a copy function, an image data transmission function, and a printer function. In implementing the copy function, the control unit 110 controls reading of image data of an original document with the reader unit 120, and printing on paper using the image data with the printer unit 130. In implementing the image data transmission function, the control unit 110 converts image data of an original document read with the reader unit 120 into code data, and transmits the code data to the monitoring terminals 161 and 162 via the network 160. In implementing the printer function, the control unit 110 converts code data (print data) received from the monitoring terminals 161 and 162 via the network 160 into image data, and transmits the image data to the printer unit 130. The printer unit 130 performs printing on paper, using the received image data.

The control unit 110 executes processing based on a program stored in, for example, a memory of the control unit 110 to implement the functions of the image forming apparatus 100 and processing in a flowchart illustrated in each of FIGS. 7 to 11, and 13 (described below).

(Description of Standard Technology)

A description is given of information acquisition from a network device based on Request for Comments (RFC) published by the Internet Engineering Task Force (IETF). The RFC is published to standardize technologies to be utilized on the Internet. Meanwhile, Simple Network Management Protocol (SNMP) is used as an information monitoring protocol of a device on a network. A network device managed by SNMP has management information base (MIB) information. The network device is managed by responding to an SNMP request from a monitoring terminal. Examples of the structure of the MIB information include specifications established as standards by the IETF, specifications established as industry standards by the Printer Working Group (PWG), and private MIB specifications formed through expansion by vendors.

The MIB information has a hierarchical structure for each field, and a number is assigned to each branch. These numbers connected to one another form an object identifier (OID). Various RFCs or private information formed through expansion by companies define(s) what information an object with the hierarchical structure and the OID has and what data type defines the object. The definition of the data type is also specified in the RFC as the Structure of Management Information (SMI). The SMI is expressed in a description language called Abstract Syntax Notation One (ASN.1) defined by the International Organization for Standardization (ISO) and the International Telecommunication Union Telecommunication Standardization Sector (ITU-T).

These technical specifications may be changed, and updated as technology progresses. For example, in the RFC, there is a number called "RFC xxxx". In updating specifications open to the public, an old number becomes obsolete, and a new number is assigned.

To monitor the status of an image forming apparatus from a remote monitoring terminal on a network by using SNMP and MIB, Printer MIB (RFC 3805) is open to the public. The specifications of this Printer MIB include, besides specifications for periodical polling monitoring of an image forming apparatus targeted to be managed from a monitoring terminal, specifications for providing status notification to the monitoring terminal according to a status change of the managed image forming apparatus. One of methods for providing notification from the network device to the monitoring terminal by using SNMP is a notification method using InformRequest.

(Notification Method Using InformRequest)

Figure 2:
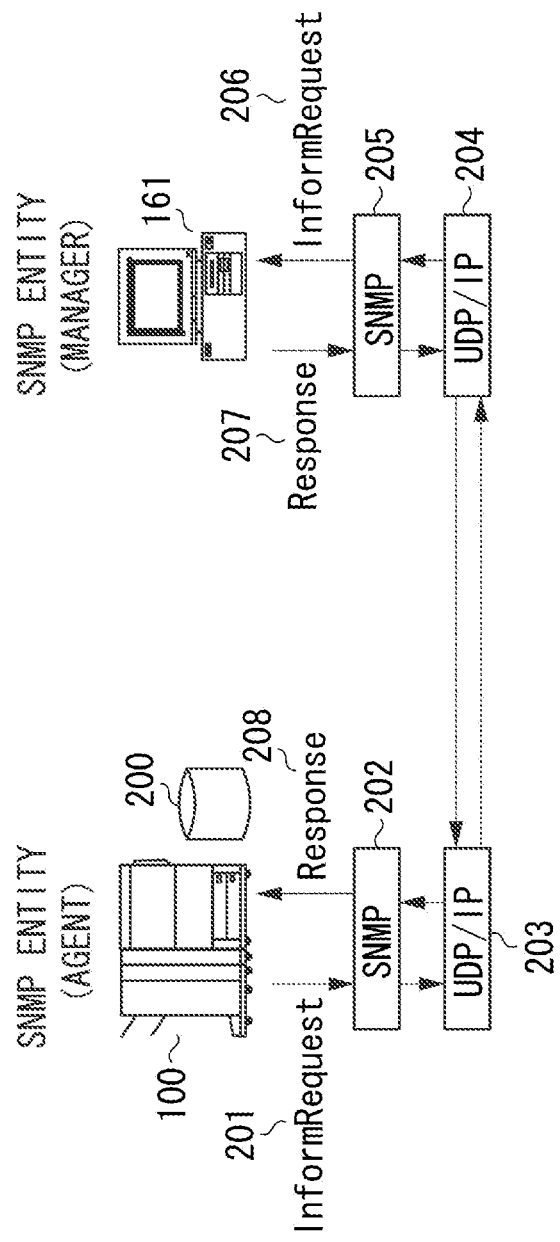
FIG. 2 is a diagram illustrating a notification method using InformRequest.

Next, the notification method using the InformRequest will be briefly described with reference to FIG. 2.

A management function based on the SNMP is implemented by a component called an SNMP entity. Here, for convenience, a side having information managed with SNMP is referred to as an agent, and a side that manages the information is referred to as a manager. The image forming apparatus 100 is the agent, i.e., the side having information thereof managed, and has MIB information 200 as the information to be managed. In the image forming apparatus 100, the monitoring terminal 161 of the manager is registered beforehand as an information notification destination. The image forming apparatus 100 is set to provide notification in a case where a change occurs in the MIB information 200.

The MIB information 200 includes various types of managed information and settings set in advance to specify for which piece of information, among the various types of managed information, the notification is to be issued when a change occurs in the piece of information. In the example of the Printer MIB, the specifications defines the agent provides notification to the manager when the MIB information 200 changes due to occurrence of an error in the image forming apparatus 100. FIG. 3 illustrates an example of error information to be notified by the agent to the manager in the Printer MIB. FIG. 3 illustrates correspondence between an error that occurs in the image forming apparatus and an error code to be notified by the agent to the manager when the error occurs. For example, the image forming apparatus 100 notifies the monitoring terminal 161 of an error code "808 (inputMediaSupplyEmpty)" as an error indicating "out of paper" when the paper feeding unit 131 becomes out of paper.

In providing notification with the InformRequest, the image forming apparatus 100 sets a notification type as an InformRequest 201 at occurrence of a change in the MIB information 200 and calls a SNMP module 202 together with MIB information to be notified. The SNMP module 202 calls a User Diagram Protocol/Internet Protocol (UDP/IP) communication module 203, and provides notification to a UDP/IP communication module 204 of the monitoring terminal 161 of the manager, together with the MIB information. The UDP/IP communication module 204 notifies an SNMP module 205 that the notification whose notification type is InformRequest 201 has been received from the image forming apparatus 100 serving as the agent, together with the received MIB information. With an InformRequest 206, the SNMP module 205 notifies an apparatus monitoring application which runs on the monitoring terminal 161 that the notification is arrived together with the notified MIB information from the image forming apparatus 100. Upon receiving the notification about the MIB information from the image forming apparatus 100 with the InformRequest 206, the apparatus monitoring application running on the monitoring terminal 161 performs processing for response. More specifically, the apparatus monitoring application sets a Response 207 in response to the InformRequest 206, in the SNMP module 205 as an acknowledgement of the receipt. To provide the acknowledgement to the image forming apparatus 100, the SNMP module 205 calls the UDP/IP communication module 204 and transmits the acknowledgement to the UDP/IP communication module 203 of the image forming apparatus 100. The SNMP module 202 provides a Response 208 as the acknowledgement of the InformRequest 201 to the image forming apparatus 100. Here, in a case where a predetermined period of time elapses after start of notification of the InformRequest 201 before receipt of the Response 208, the image forming apparatus 100 determines that the InformRequest 201 has not been received by the monitoring terminal 161. In a case where it is determined that the InformRequest 201 has not been received by the monitoring terminal 161, the image forming apparatus 100 retransmits the InformRequest 201 a predetermined number of times at predetermined intervals. The InformRequest is an example of status change information.

(SNMPv3 User Settings)

Figure 4:
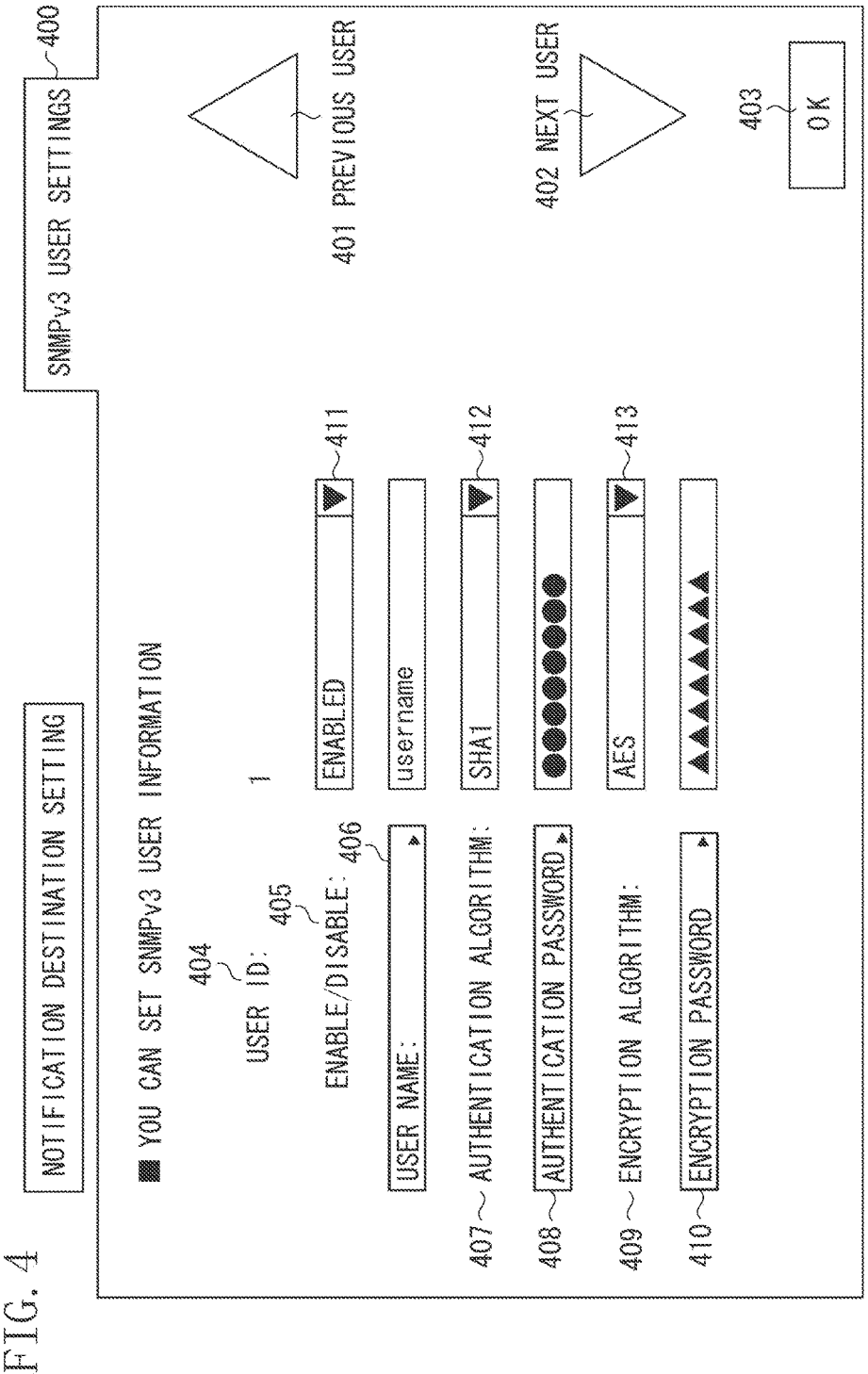
FIG. 4 is a diagram illustrating a user setting screen and setting items of Simple Network Management Protocol version 3 (SNMPv3).

Next, a user setting screen and setting items of version 3 of the Simple Network Management Protocol (SNMPv3) will be described with reference to FIG. 4. SNMPv3 is standardized in IETF standard (STD) 62, and communication using a user-based authentication mechanism and encryption is performed through the SNMPv3. A user setting screen 400 is an example of a setting screen for user setting of SNMPv3. Since a plurality of SNMPv3 users may exist, buttons 401 and 402 are provided for shifting the current user screen to a screen for a previous user and to a screen for a next user, respectively. A user identification (ID) 404 uniquely identifies a SNMPv3 user in the control unit 110. The user ID 404 is managed by the control unit 110, and thus is provided only for display. The user cannot operate, for example, change the user ID 404 in the user setting screen 400.

A setting item 405 is for enabling and disabling SNMPv3 settings for the user ID indicated by the user ID 404. The user can change the setting item 405 by selecting "enable" or "disable" in pull-down setting 411. A setting item 406 is for setting a user name for the user ID of the user ID 404. The user having pressed the setting item 406 can shift the current screen to an input screen such as a screen including a software keyboard, in which the user name can be input or changed. A setting item 407 is for setting an authentication algorithm for authentication in SNMPv3 communication for the user name set in the setting item 406. As the setting item 407, the user can select any of "None", "Message Digest (MD) 5", and "Secure Hash Algorithm (SHA) 1" in pull-down setting 412. A setting item 408 is for inputting an authentication password in the authentication algorithm selected as the setting item 407. The user having pressed the setting item 408 can shift the current screen to an input screen such as a screen including a software keyboard in which the authentication password can be input or changed. A setting item 409 is for setting an encryption algorithm to be used in the SNMPv3 communication for the user ID 404. As the setting item 409, the user can select any of "None", "Data Encryption Standard (DES)", and "Advanced Encryption Standard (AES)" in pull-down setting 413. A setting item 410 is for inputting an encryption password in the encryption algorithm selected as the setting item 409. The user having pressed the setting item 410 can shift the current screen to an input screen such as a screen including a software keyboard in which the encryption password can be input or changed. A minimum character string length or a maximum character string length may be set for each of the user name of the setting item 406, the encryption password of the setting item 408, and the authentication password of the setting item 410.

A button 403 is a button to be pressed by the user after completion of the user settings of SNMPv3. By the user pressing the button 403, SNMPv3 user setting values are transmitted from the operation unit 140 to the control unit 110. The control unit 110 performs the SNMPv3 communication based on the received SNMPv3 user setting values.

(InformRequest Notification Settings)

Figure 5:
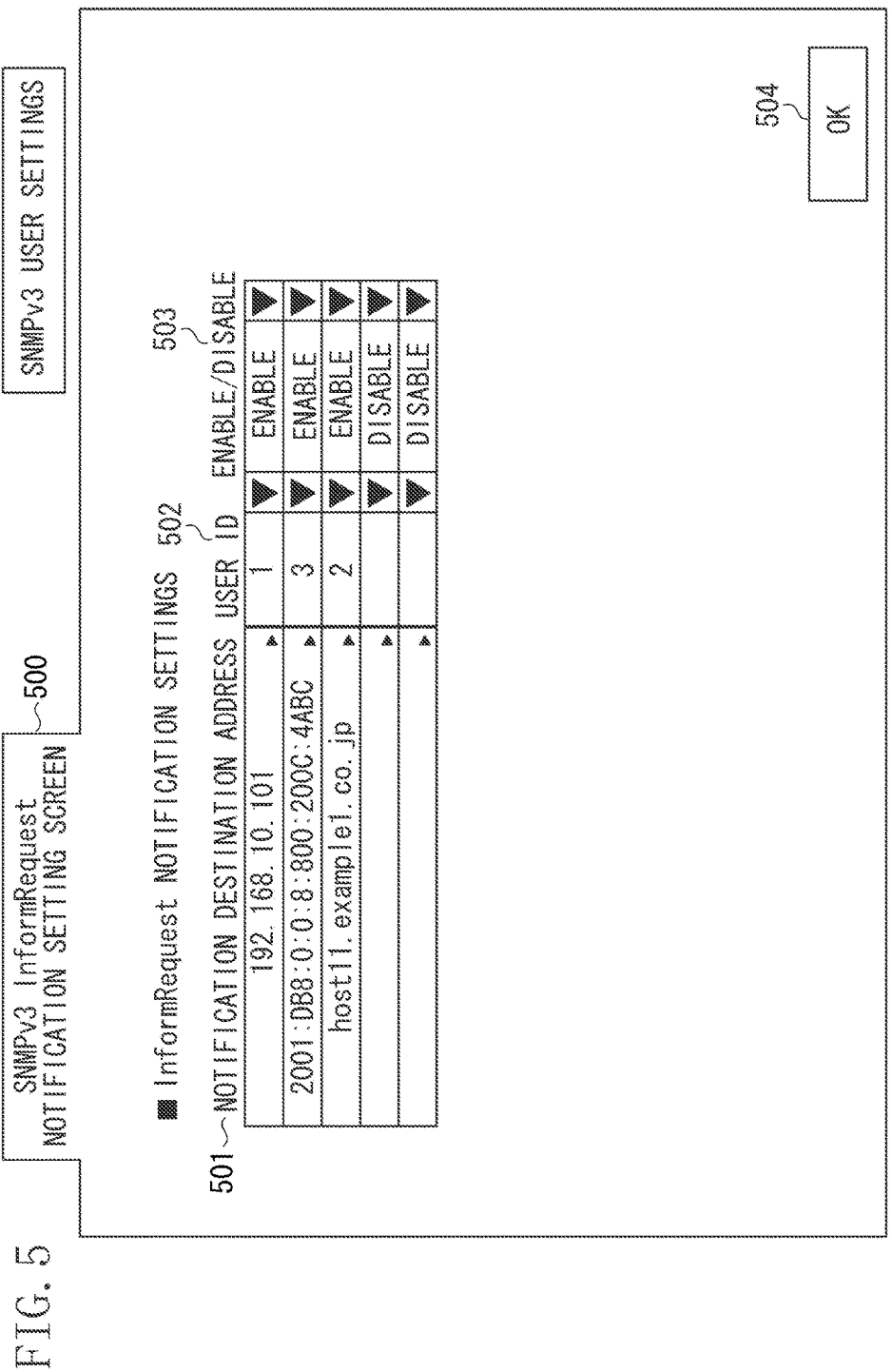
FIG. 5 is a diagram illustrating a setting screen for InformRequest notification of SNMPv3.

Next, a setting screen and setting items of InformRequest notification with SNMPv3 will be described with reference to FIG. 5. An InformRequest notification setting screen 500 is an operation unit screen for setting InformRequest notification with SNMPv3.

A setting item 501 indicates address setting items for notification destinations. In a screen example illustrated in FIG. 5, the setting item 501 allows setting of each of an Internet Protocol version 4 (IPv4) address, an Internet Protocol version 6 (IPv6) address, and a fully qualified domain name (FQDN), as a notification destination. A setting item 502 is for setting a SNMPv3 user ID to be used in providing notification. The setting item 502 is associated with the user ID 404. The details of the user ID is set as described above with reference to FIG. 4. A setting item 503 is for changing whether the notification destination is enabled or disabled. A button 504 is a button to be pressed by the user after completion of the notification destination setting for InformRequest. By the user pressing the button 504, InformRequest notification setting values are transmitted from the operation unit 140 to the control unit 110. The control unit 110 notifies an InformRequest, based on the received InformRequest notification setting values.

(InformRequest Notification Table)

The image forming apparatus 100 has an InformRequest notification table 600 for managing notification and retransmission of InformRequest. FIG. 6 is a diagram illustrating an example of the InformRequest notification table 600. The InformRequest notification table 600 is operated by the control unit 110.

When the control unit 110 has detected occurrence of an error in the image forming apparatus 100, the control unit 110 transmits an InformRequest according to the setting information in the InformRequest notification setting screen 500. More specifically, the control unit 110 transmits the InformRequest to the notification destination address set to "enable" as the setting item 501 in the enable/disable setting of the setting item 503, using the SNMPv3 user setting values associated with the user ID selected as the setting item 502. The control unit 110 that has transmitted the InformRequest adds to the InformRequest notification table 600 an entry in which a request-id of an InformRequest packet, the notification destination address, the used SNMPv3 user ID, and the notified error code are in association with one another. The control unit 110 retransmits the InformRequest added to the InformRequest notification table 600 a predetermined number of times at predetermined intervals. When the control unit 110 has received a Response to the InformRequest added to the InformRequest notification table 600 or when the control unit 110 has completed the retransmission the predetermined number of times, the control unit 110 performs following processing. Specifically, the control unit 110 clears the entry of the InformRequest from the InformRequest notification table 600.

Figure 7:
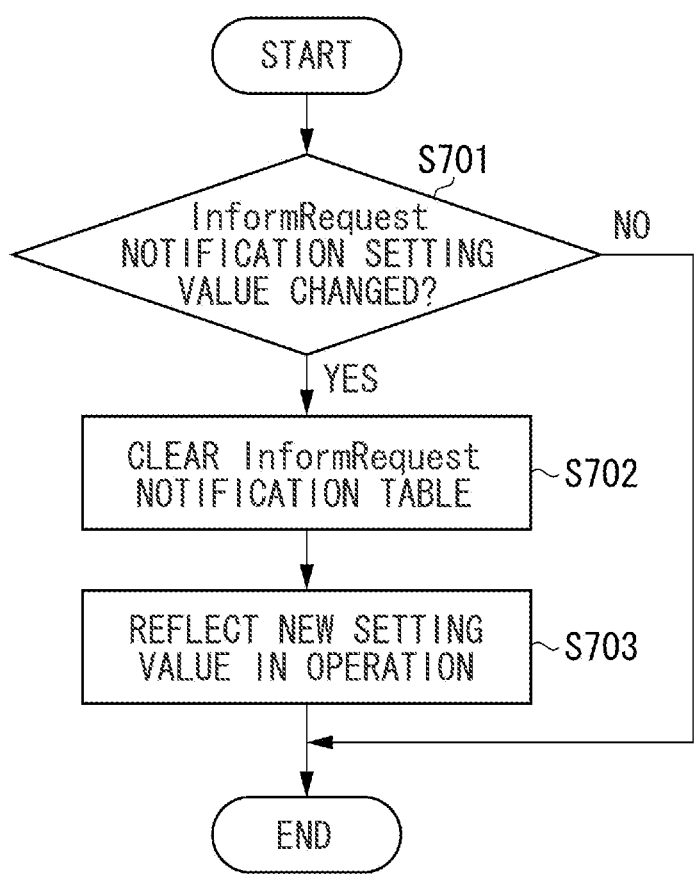
FIG. 7 is a flowchart illustrating an example of information processing.

FIG. 7 is a flowchart illustrating processing to be performed when the InformRequest notification setting screen 500 of the image forming apparatus 100 is changed.

When the user presses the button 504 after completing the InformRequest notification settings, the operation unit 140 transmits the InformRequest notification setting values to the control unit 110. The control unit 110 that has received the InformRequest notification setting values starts the processing of this flowchart. In step S701, the control unit 110 compares the new InformRequest notification setting values received from the operation unit 140, with the current InformRequest notification setting values cached by the control unit 110, and determines whether there is a difference therebetween (whether there is a change in the InformRequest notification setting values). If there is a difference (YES in step S701), the processing proceeds to step S702. If there is no difference (NO in step S702), the processing ends. In step S702, the control unit 110 clears all the entries in the InformRequest notification table 600, so that all InformRequest notification processes of the control unit 110 are cancelled. In step S703, the control unit 110 reads in the new setting values received from the operation unit 140, and reflects the new setting values in the subsequent InformRequest notification process.

Figure 8:
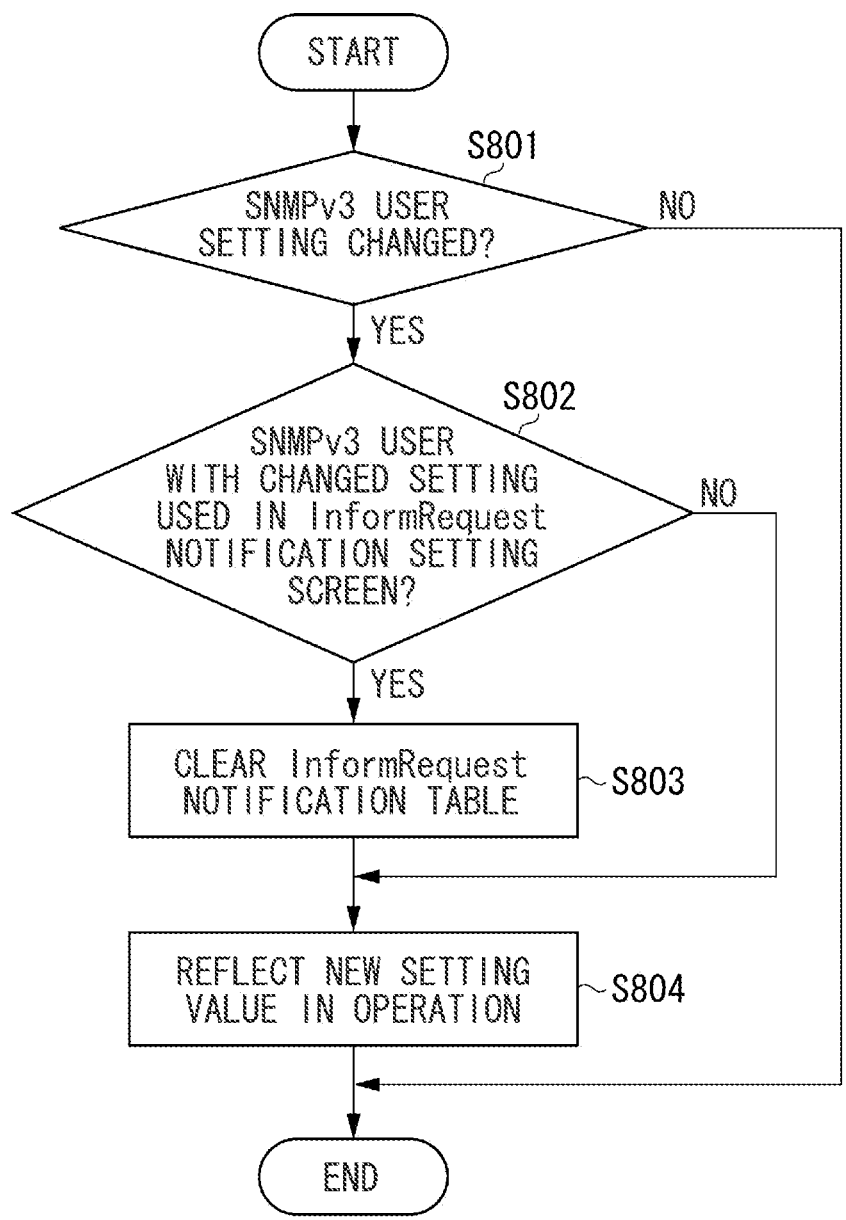
FIG. 8 is a flowchart illustrating an example of information processing.

FIG. 8 is a flowchart that illustrates processing when the user setting screen 400 of SNMPv3 in the image forming apparatus 100 is changed.

When the user presses the button 403 after completing the SNMPv3 user settings, the operation unit 140 transmits the SNMPv3 user setting values to the control unit 110. The control unit 110 that has received the SNMPv3 user setting values starts the processing of this flowchart. In step S801, the control unit 110 compares the new SNMPv3 user setting values received from the operation unit 140, with the current SNMPv3 user setting values cached by the control unit 110, and determines whether there is a SNMPv3 user with changed setting values. If there is a SNMPv3 user with the changed setting values (YES in step S801), the control unit 110 acquires the user ID corresponding to the SNMPv3 user with the changed setting values and the processing proceeds to step S802. If there is no SNMPv3 user with the changed setting values (NO in step S801), the processing of the flowchart illustrated in FIG. 8 ends. In step S802, the control unit 110 determines whether the user ID 404 of the SNMPv3 user with the changed SNMPv3 user setting values is used in the InformRequest notification setting screen 500. If the user ID 404 of the SNMPv3 user with the changed SNMPv3 user setting values is used (YES in step S802), the processing proceeds to step S803, but if not (NO in step S802), the processing proceeds to step S804. In step S803, the control unit 110 clears all the entries in the InformRequest notification table 600, so that all the InformRequest notification processes of the control unit 110 are cancelled. In step S804, the control unit 110 reads in the new setting values received from the operation unit 140, and reflects the new setting values in the subsequent SNMPv3 communication.

A second exemplary embodiment will be described below. In the example described according to the first exemplary embodiment, all the entries in the InformRequest notification table 600 are cleared in a case where there is a change in the InformRequest notification setting values or a change in the SNMPv3 user setting values used in the InformRequest notification setting. However, in the example according to the first exemplary embodiment, since all the entries in the InformRequest notification table 600 are cleared, InformRequest notification irrelevant to the change is canceled. In a configuration to be described below according to a second exemplary embodiment, only an entry related to the changed setting information is canceled from the InformRequest notification table 600.

Figure 9:
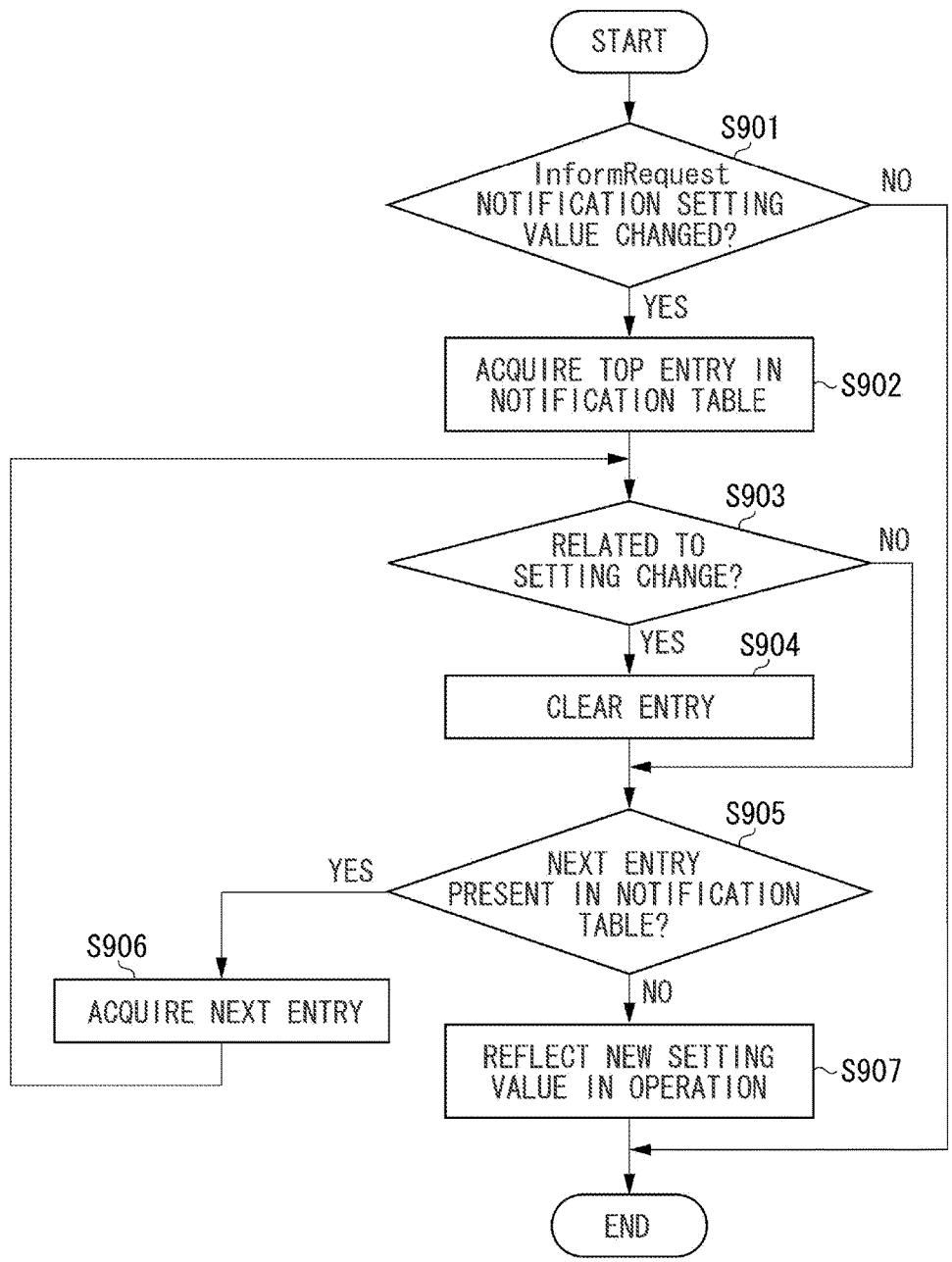
FIG. 9 is a flowchart illustrating an example of information processing.

FIG. 9 is a flowchart illustrating processing performed when the user setting screen 400 of SNMPv3 in the image forming apparatus 100 is changed.

When the user presses the button 504 after completing the InformRequest notification settings, the operation unit 140 transmits the InformRequest notification setting values to the control unit 110. The control unit 110 that has received the InformRequest notification setting values starts the processing of the flowchart illustrated in FIG. 9. In step S901, the control unit 110 compares the new InformRequest notification setting values received from the operation unit 140, with the current InformRequest notification setting values cached by the control unit 110, and determines whether there is a change in the InformRequest notification setting values. If there is a change in the InformRequest notification setting values (YES in step S901), the processing proceeds to step S902, but if not (NO in step S901), the processing of flowchart illustrated in FIG. 9 ends. In step S902, the control unit 110 acquires the top entry in the InformRequest notification table 600. In step S903, the control unit 110 determines whether the notification destination address of the current setting item 501 and the SNMPv3 user ID of the setting item 502 to be used, in the information about the changed InformRequest notification settings, coincide with information corresponding to the acquired entry. If they coincide with each other (YES in step S903), the control unit 110 determines that the acquired entry as an entry related to the setting change, and the processing proceeds to step S904. If not (NO in step S903), the processing proceeds to step S905. In step S904, the control unit 110 clears the entry determined to be related to the setting change in step S903, from the InformRequest notification table 600, so that the InformRequest notification process having been performed based on this entry is cancelled. In step S905, the control unit 110 checks whether the next entry following the entry acquired in step S903 is present in the InformRequest notification table. In a case where the next entry is present (YES in step S905), the processing proceeds to step S906, but if not (NO in step S905), the processing proceeds to step S907. In step S906, the control unit 110 acquires the next entry, and then returns to step S903. The control unit 110 performs the processing from step S903 to step S905 for this entry. On the other hand, in step S907, the control unit 110 reads the new setting values received from the operation unit 140, and reflects the new setting values in the subsequent InformRequest notification process.

Figure 10:
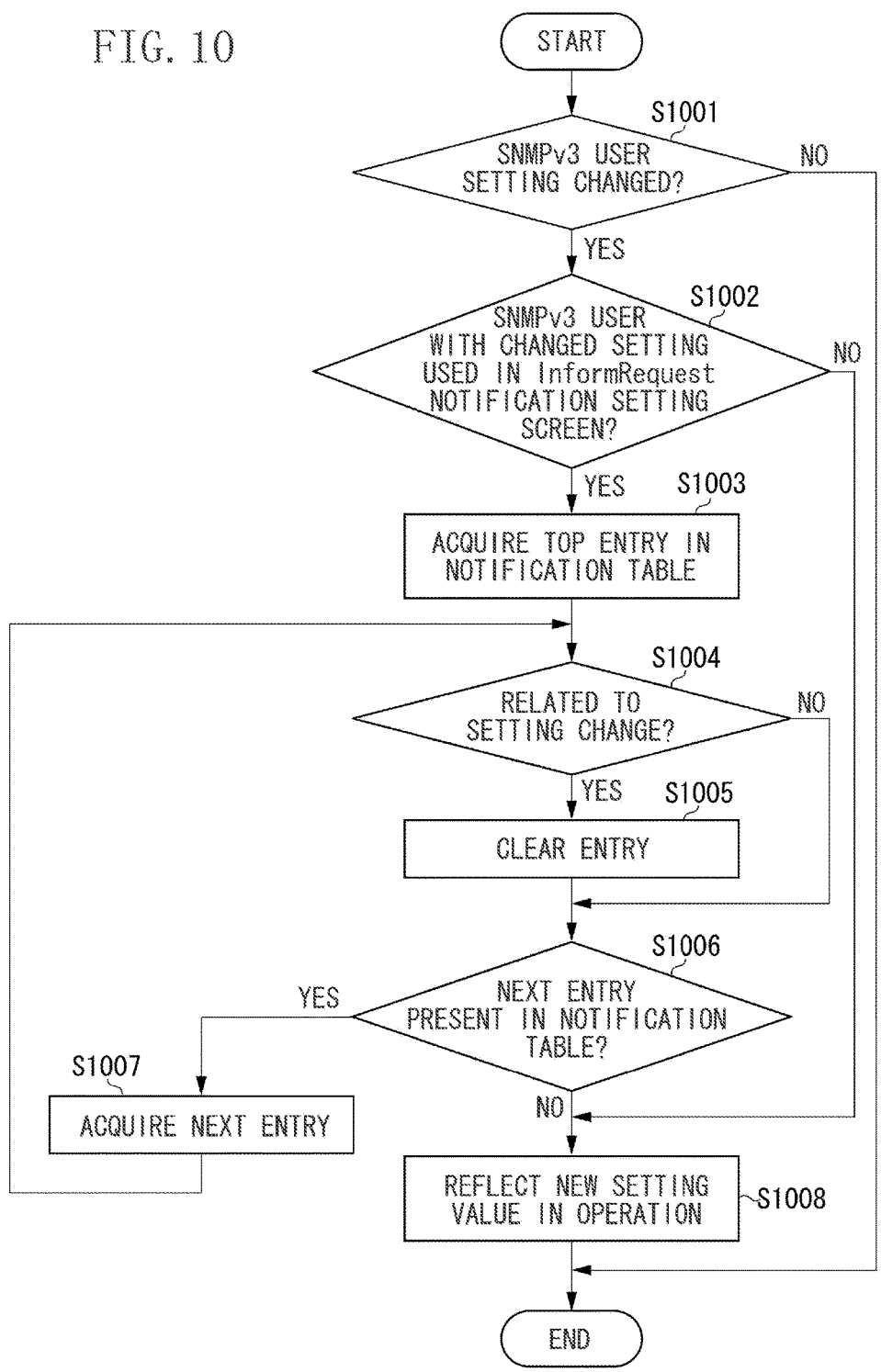
FIG. 10 is a flowchart illustrating an example of information processing.

FIG. 10 is a flowchart that illustrates processing to be performed when the user setting screen 400 of SNMPv3 in the image forming apparatus 100 is changed.

When the user presses the button 403 after completing the SNMPv3 user settings, the operation unit 140 transmits the SNMPv3 user setting values to the control unit 110. The control unit 110 that has received the SNMPv3 user setting values starts the processing of the flowchart illustrated in FIG. 10. In step S1001, the control unit 110 compares the new SNMPv3 user setting values received from the operation unit 140, with the current SNMPv3 user setting values cached by the control unit 110, and determines whether there is a change in the SNMPv3 user setting values. As a result of the comparison, if it is determined that there is a change in the SNMPv3 user setting values (YES in step S1001), the control unit 110 acquires the user ID corresponding to the SNMPv3 user with the changed setting value and the processing proceeds to step S1002. If it is determined that there is no change in the SNMPv3 user setting values (NO in step S801), the processing of the flowchart illustrated in FIG. 10 ends. In step S1002, the control unit 110 determines whether the user ID 404 of the user with the changed SNMPv3 user setting value is used in the InformRequest notification setting screen 500. If it is determined that the user ID 404 is used (YES in step S1002), the processing proceeds to step S1003, but if not (NO in step S1002), the processing proceeds to step S1008. In step S1003, the control unit 110 acquires the top entry in the InformRequest notification table 600. In step S1004, the control unit 110 determines whether the user ID 404 of the user with the changed SNMPv3 user setting value coincides with the SNMPv3 user ID in the acquired entry. If it is determined that they coincides with each other (YES in step S1004), the control unit 110 determines that the acquired entry relates to the setting change, and the processing proceeds to step S1005. If not (NO in step S1004), the processing proceeds to step S1006. In step S1005, the control unit 110 clears the entry determined to be related to the setting change in step S1004, from the InformRequest notification table 600, so that the InformRequest notification process having been performed based on this entry is cancelled. In step S1006, the control unit 110 checks whether the next entry following the entry acquired in step S1003 is present in the InformRequest notification table. If the next entry is present (YES in step S1006), the processing proceeds to step S1007, but if not (NO in step S1006), the processing proceeds to step S1008. In step S1007, the control unit 110 acquires the next entry, and then returns to step S1004. The control unit 110 performs the processing from step S1004 to step S1006 for this entry. On the other hand, in step S1008, the control unit 110 reads the new setting values received from the operation unit 140, and reflects the new setting values in the subsequent SNMPv3 communication.

A third exemplary embodiment will be described below. In an example described according to each of the first and second exemplary embodiments, when there is occurrence of a change in the InformRequest notification settings or a change in the SNMPv3 user setting values used in the InformRequest notification settings, the InformRequest being notified at that moment is cancelled. By contrast, in an example to be described below according to a third exemplary embodiment, the InformRequest notification setting and setting change of the SNMPv3 user setting values are prohibited during the InformRequest notification.

Figure 11:
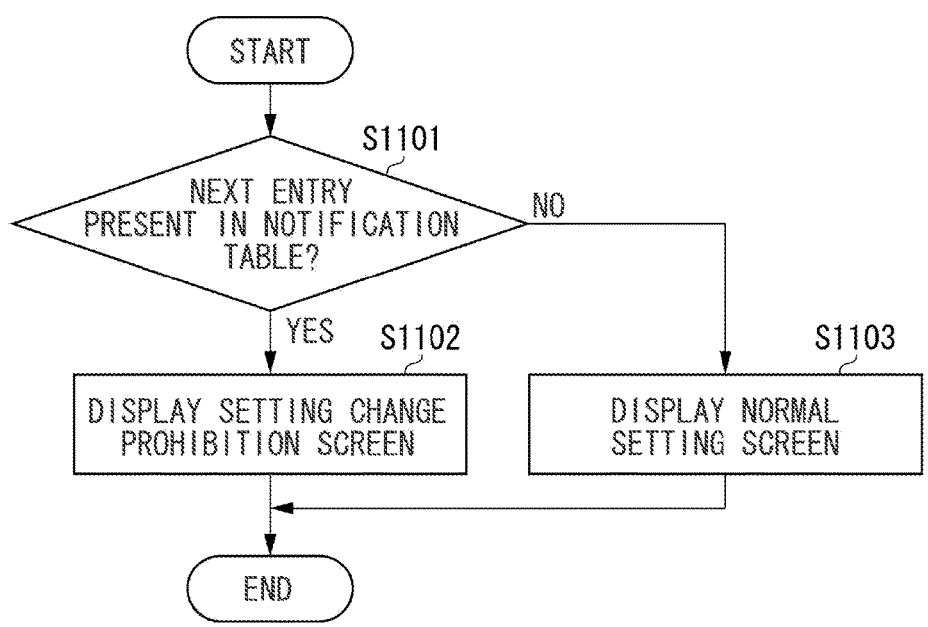
FIG. 11 is a flowchart illustrating an example of information processing.

FIG. 11 is a flowchart illustrating an example of information processing.

The control unit 110 receives a request for displaying the user setting screen 400 of SNMPv3 or the InformRequest notification setting screen 500, from the operation unit 140. The control unit 110 then starts the processing of the flowchart illustrated in FIG. 11. In step S1101, the control unit 110 determines whether there is an entry in the InformRequest notification table 600. If it is determined that there is an entry in the InformRequest notification table 600 (YES in step S1101), the processing proceeds to step S1102. If it is determined that there is no entry (NO in step S1101), the processing proceeds to step S1103. In step S1102, the control unit 110 displays a setting change prohibition screen 1200 on the operation unit 140. In step S1103, the control unit 110 displays a normal setting screen on the operation unit 140. Specifically, in step S1103, the control unit 110 displays a setting screen (the user setting screen 400 of SNMPv3, or the InformRequest notification setting screen 500), which is requested from the operation unit 140 when the processing in the flowchart starts.

Figure 12:
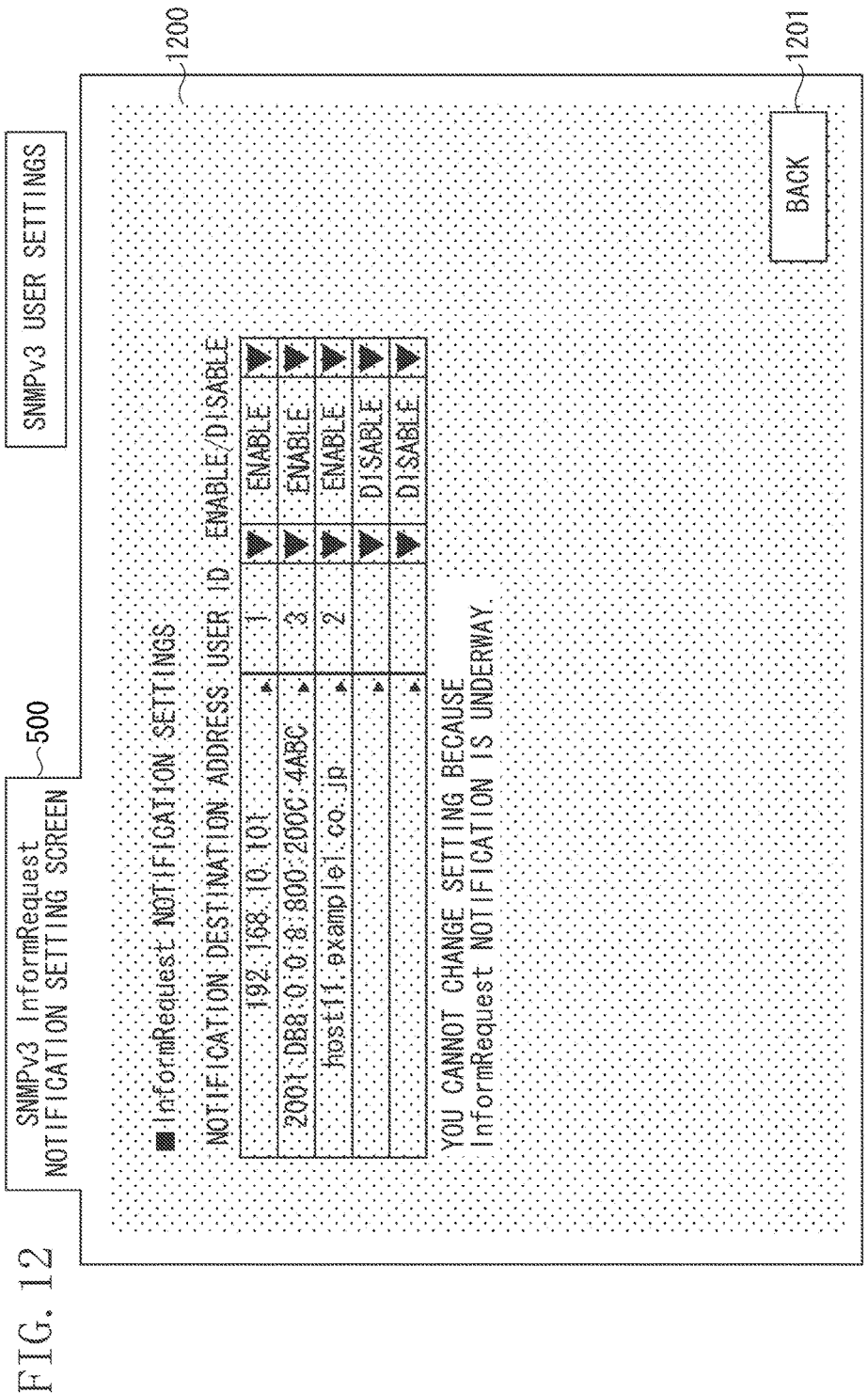
FIG. 12 is a diagram illustrating an example of a setting change prohibition screen.

FIG. 12 is a diagram illustrating an example of the setting change prohibition screen 1200 displayed on the operation unit 140 in step S1102. The setting change prohibition screen 1200 displays a message indicating that setting change is prohibited in such a manner that the InformRequest notification setting screen 500 is overlaid. When the user presses a button 1201, the operation unit 140 transmits a request for displaying a menu screen to the control unit 110. The control unit 110 then displays the menu screen at the operation unit 140. In the example described here with reference to FIG. 12, the setting change prohibition screen 1200 is displayed for the InformRequest notification setting screen 500. The configuration also applies to a case where a setting change prohibition screen is displayed for the user setting screen 400 of SNMPv3. In addition, in the present exemplary embodiment, the setting change prohibition screen 1200 is displayed, for example, on the InformRequest notification setting screen 500, as an example of the prohibition against changing the setting values. However, the present exemplary embodiment is not limited thereto. For example, the control unit 110 may display a message indicating that the setting values cannot be changed, with display of the InformRequest notification setting screen 500 being grayed out. Further, the control unit 110 may display only a message indicating that the setting values cannot be changed, without displaying the InformRequest notification setting screen 500.

A fourth exemplary embodiment will be described below. In an example described according to the third exemplary embodiment, the InformRequest notification settings and the setting change of the SNMPv3 user setting values are prohibited during the InformRequest notification. In an example to be described below according to a fourth exemplary embodiment, the control unit 110 causes the user having performed an operation for changing the SNMP user setting values (setting change) to select whether the setting change is to be performed or cancelled.

Figure 13:
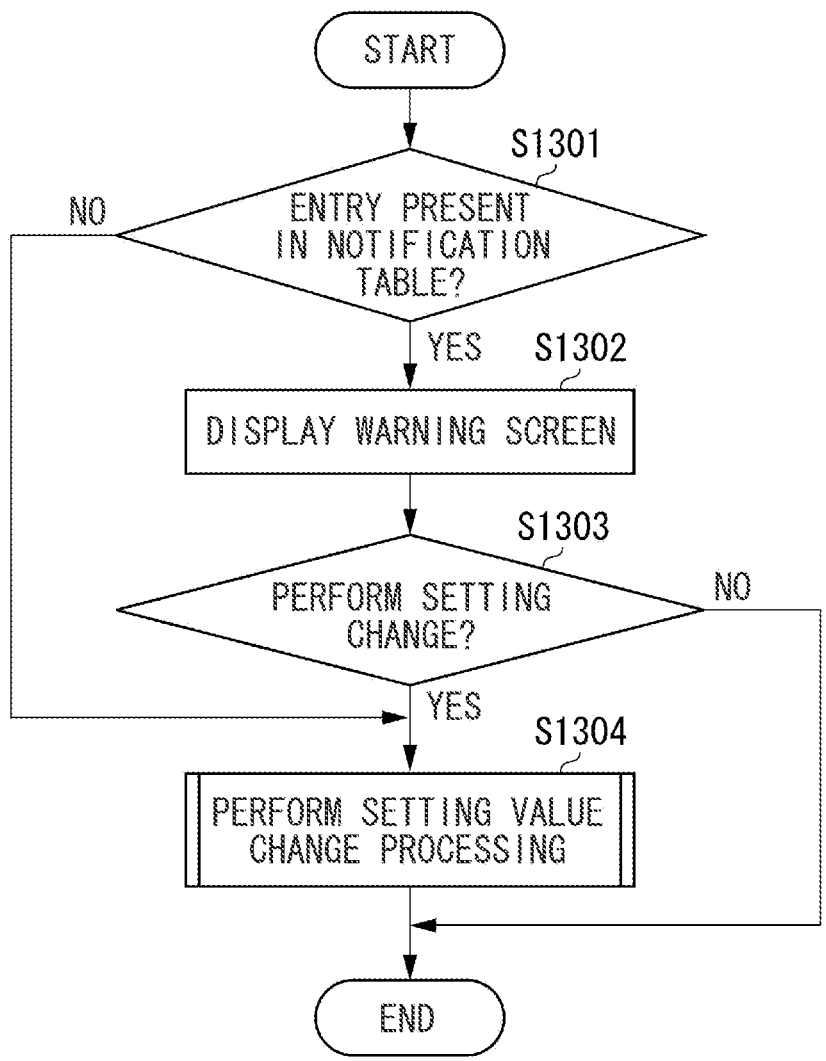
FIG. 13 is a flowchart illustrating an example of information processing.

FIG. 13 is a flowchart illustrating an example of information processing.

When the button 403 in the user setting screen 400 of SNMPv3 or the button 504 in the InformRequest notification setting screen 500 is pressed, the control unit 110 receives the setting values from the operation unit 140. The control unit 110 then starts the processing of this flowchart. In step S1301, the control unit 110 determines whether there is an entry in the InformRequest notification table 600. If it is determined that there is an entry in the InformRequest notification table 600 (YES in step S1301), the processing proceeds to step S1302. If it is determined that there is no entry in the InformRequest notification table 600 (NO in step S1301), the processing proceeds to step S1304. In step S1302, the control unit 110 displays a warning screen 1400 on the operation unit 140. Then, when the user has canceled the InformRequest notification and the control unit 110 receives a selection result of whether to carry out the setting change from the operation unit 140, the processing proceeds to step S1303.

Figure 14:
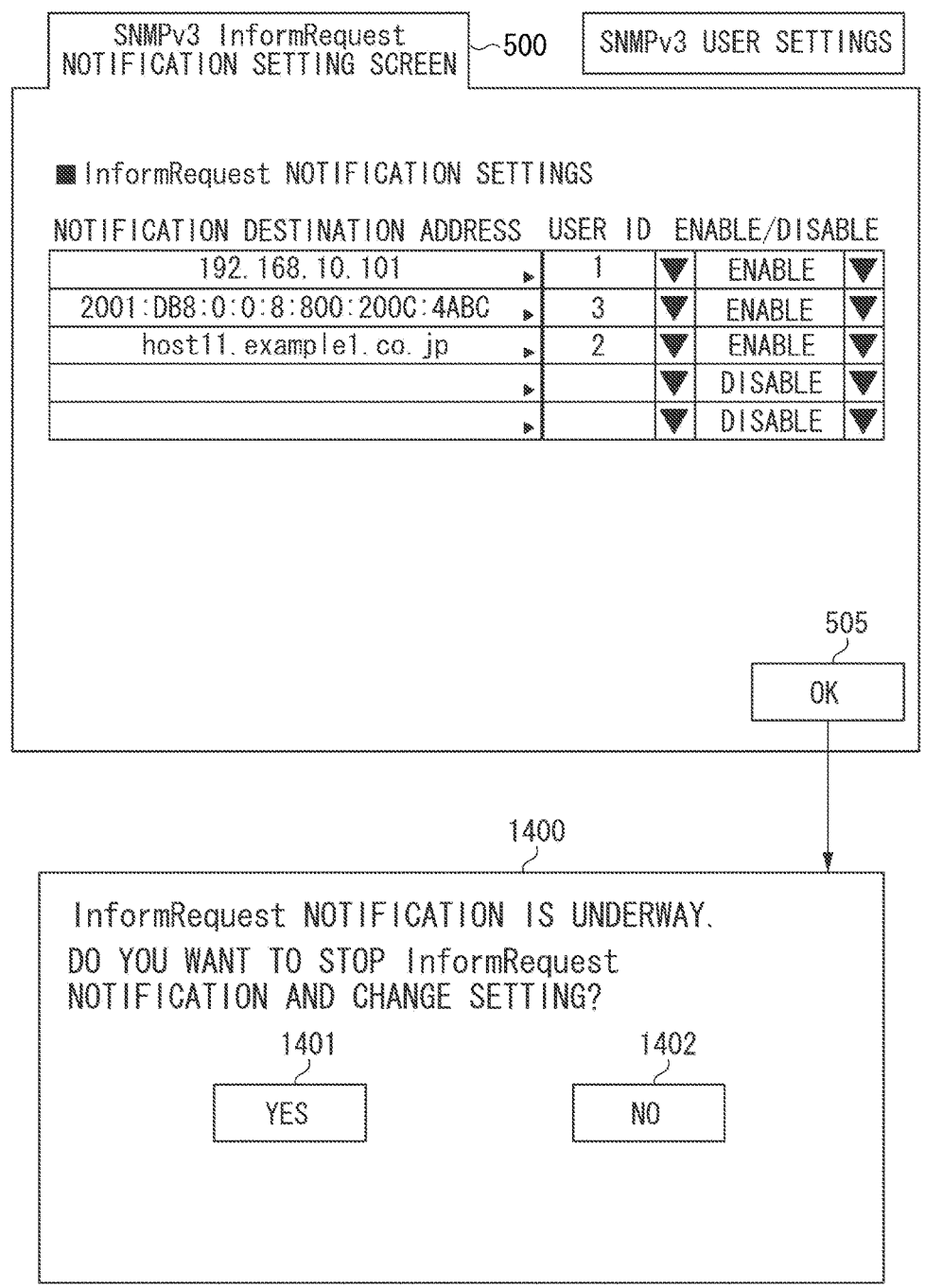
FIG. 14 is a diagram illustrating an example of a warning screen.

Here, the warning screen 1400 will be described with reference to FIG. 14. The warning screen 1400 displays a message indicating that the InformRequest notification is currently underway, and options of cancelling the InformRequest being notified to perform the setting change or not. When the user presses a button 1401, the operation unit 140 transmits a setting change request to the control unit 110. When the user presses a button 1402, the operation unit 140 transmits a setting-change stop request to the control unit 110. FIG. 14 illustrates an example in which the warning screen 1400 appears in response to the press of a button 505 in the InformRequest notification setting screen 500. In the present exemplary embodiment, a similar screen also appears in response to the press of the button 403 in the user setting screen 400 of SNMPv3.

In step S1303, the control unit 110 determines whether to perform the setting change, based on the result of the choosing in the warning screen 1400, received from the operation unit 140. If it is determined that the setting change is to be performed (YES in step S1303), the processing proceeds to step S1304. If it is determined that the setting change is to be cancelled (NO in step S1303), the processing in the flowchart illustrated in FIG. 13 ends. In step S1304, the control unit 110 performs the setting value change processing described with reference to FIGS. 7 and 8, and reflects the new setting values, received from the operation unit 140 at the time when the processing of the flowchart starts, in the subsequent operation. In addition, according to the present exemplary embodiment, the configuration of displaying the warning screen 1400 is described as an example of warning against the change of the setting value. However, the present exemplary embodiment is not limited to thereto. For example, the control unit 110 may display a message indicating that the InformRequest notification is underway, on a part of the InformRequest notification setting screen 500, when this screen is displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-250237, filed Dec. 22, 2015, which is hereby incorporated by reference herein in its entirety.

What is claimed is:

1. A control method for an image forming apparatus configured to perform transmission of information, the control method comprising:
   performing, by a network interface, retransmission of the information a predetermined number of times based on an entry about retransmission of the information in a case where the transmission of the information fails, wherein the entry about the retransmission of the information is added to a notification table managed by the image forming apparatus;
   clearing, by a controller, the entry from the notification table, in a case where the retransmission of the information is completed the predetermined number of times or a case where the image forming apparatus receives a response to the retransmission of the information; and
   clearing, by the controller, the entry from the notification table in a case where user information necessary for the retransmission of the information is changed.

2. The control method according to claim 1, wherein the transmission of the information and the retransmission of the information are each performed using an InformRequest of Simple Network Management Protocol (SNMP).

3. The control method according to claim 1, wherein the information transmitted by the image forming apparatus indicates an error having occurred in the image forming apparatus.

4. The control method according to claim 3, wherein the error includes at least an out-of-paper error.

5. A control method for an image forming apparatus configured to perform transmission of information, the control method comprising:
   performing, by a network interface, retransmission of the information a predetermined number of times based on an entry about retransmission of the information in a case where the transmission of the information fails, wherein the entry about the retransmission of the information is added to a notification table managed by the image forming apparatus;

clearing, by a controller, the entry from the notification table, in a case where the retransmission of the information is completed the predetermined number of times or a case where the image forming apparatus receives a response to the retransmission of the information; and prohibiting, by the controller, a user from changing user information necessary for the retransmission of the information, on the condition that the entry is present in the notification table.

6. The control method according to claim 5, wherein the transmission of the information and the retransmission of the information are each performed using an Inform Request of SNMP.

7. The control method according to claim 5, wherein the information transmitted by the image forming apparatus indicates an error having occurred in the image forming apparatus.

8. The control method according to claim 7, wherein the error includes at least an out-of-paper error.

* * * * *